United States Patent

Fuhrmann

(10) Patent No.: US 8,926,461 B2
(45) Date of Patent: Jan. 6, 2015

(54) GUIDE RAIL OR TENSIONING RAIL WITH A SLEEVE, AND TRACTION MECHANISM DRIVE THEREWITH

(75) Inventor: Rainer Fuhrmann, Waischenfeld (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 333 days.

(21) Appl. No.: 12/939,291

(22) Filed: Nov. 4, 2010

(65) Prior Publication Data

US 2011/0105259 A1    May 5, 2011

(30) Foreign Application Priority Data

Nov. 5, 2009   (DE) .................. 10 2009 052 071

(51) Int. Cl.
*F16H 7/08*      (2006.01)
*F16H 7/18*      (2006.01)

(52) U.S. Cl.
CPC ......................... *F16H 7/18* (2013.01)
USPC ........................................ 474/111

(58) Field of Classification Search
USPC .......................... 474/111, 112, 140
See application file for complete search history.

(56) References Cited

U.S. PATENT DOCUMENTS

| | | | | |
|---|---|---|---|---|
| 4,535,996 | A * | 8/1985 | Cardis et al. | 277/313 |
| 4,941,769 | A * | 7/1990 | Natsume | 403/408.1 |
| 5,665,019 | A * | 9/1997 | Sheffer et al. | 474/111 |
| 5,807,052 | A * | 9/1998 | Van Boven et al. | 411/353 |
| 6,572,502 | B1 * | 6/2003 | Young et al. | 474/111 |
| 6,645,102 | B2 * | 11/2003 | Kumakura | 474/111 |
| 6,719,482 | B2 * | 4/2004 | Morita | 403/408.1 |
| 6,804,872 | B2 * | 10/2004 | Powell | 29/525.11 |
| 7,048,265 | B2 * | 5/2006 | Huprikar | 267/141.1 |
| 2006/0225267 | A1 * | 10/2006 | Wojciechowski et al. | 29/515 |
| 2008/0242460 | A1 * | 10/2008 | Hewitt et al. | 474/111 |

FOREIGN PATENT DOCUMENTS

DE        103 02 876 A1    8/2004

* cited by examiner

*Primary Examiner* — William E Dondero
*Assistant Examiner* — Mark K Buse
(74) *Attorney, Agent, or Firm* — Davidson, Davidson & Kappel, LLC

(57) ABSTRACT

A guide member, such as a guide rail or a tensioning rail, of a traction mechanism drive, for use on an internal combustion engine. The rail-like guide member, which is preferably manufactured from plastic, has at least one through opening into which a preferably metallic sleeve is inserted and which sleeve has a first end which, projecting out of the through opening, is arranged such that it can be brought into contact with an engine part. The first end of the sleeve has a larger circumference than a second end of the sleeve, which is opposite the first end.

Figure 1:
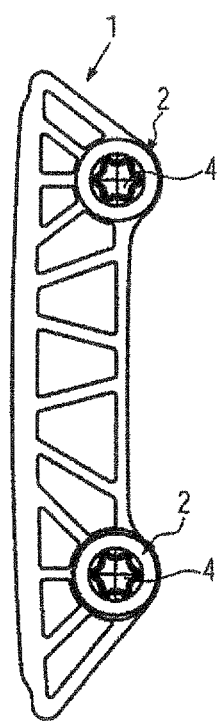

12 Claims, 4 Drawing Sheets

GUIDE RAIL OR TENSIONING RAIL WITH A SLEEVE, AND TRACTION MECHANISM DRIVE THEREWITH This application claims the priority of DE 10 2009 052 071.6 filed Nov. 5, 2009, which is incorporated by reference herein.

FIELD OF THE INVENTION

The invention relates to a guide member, such as a guide rail or a tensioning rail, of a traction mechanism drive, for use on an internal combustion engine, wherein the rail-like guide member, which is preferably manufactured from plastic, has at least one through opening into which a metallic sleeve is inserted and which sleeve has a first and which, projecting out of the through opening, is arranged such that it can be brought into contact with an engine part.

The prior art, for example DE 10302876 A1, discloses a constructional unit with a metallic sleeve which is inserted into a plastic supporting body for a tensioning rail or a guide rail of a chain control drive of a combustion engine and is fastened so as to be in contact axially with the engine housing by means of a bolt inserted through the sleeve. Said sleeve is designed as a rotationally symmetrical body and is inserted into a fastening hole in the supporting body. The sleeve here has, in the end region thereof which faces the engine, an annular step for the transition to a reduced outer diameter. The sleeve is supported axially by said step on a shoulder, which is formed within the fastening hole in the supporting body and has a reduced inner diameter.

Whereas use has hitherto always been made in conventional guide or tensioning rails in traction mechanism drives of special precision bolts without the use of sleeves or of sleeves having complicated knurled portions on the circumference, DE 10302876 A1 now provides the solution of using metal sleeves without any knurling and without additional precision bolts.

However, the solution disclosed in DE 10302876 A1 continues to have the disadvantage that, in the interaction of the metal sleeve with an engine part made of light metal, for example an engine block, the surface pressure between the sleeve and the engine part is of such a magnitude that damage results. The damage unfortunately occurs here in the region of the engine part. This is because the metal sleeve is generally manufactured from material more capable of pressure resistance than the engine part.

The problem occurs particularly if a material combination of steel and aluminum is present. Steel is understood as meaning any iron-containing alloys. Aluminum is also short for any type of aluminum-containing alloys. As an alternative, a similar light metal alloy may also be used for an engine part, with the same problems then occurring as in conjunction with a steel sleeve.

Since the sleeves are generally designed for cost reasons as thin-walled tubes in the form of bushings, steel is traditionally appropriate as the material. Since the cost aspect predominates over the saving on weight for said small components, a change to light metal as the material for the sleeve is generally not an appropriate means.

However, it is the object of the present invention to provide guide members, such as guide rails or tensioning rails, which can be fastened in an engine in a damage-free and fail-safe manner, even if the engine is manufactured from light metal.

A guide member is understood as meaning an elongate, rail-like member which guides and/or tensions the traction mechanism and is used in traction mechanism drives in internal combustion engines. Control drives of this type are generally used for controlling the combustion operation. Such control drives and internal combustion engines are used, inter alia, in land craft, water craft or aircraft. In particular, said devices are used in automobiles or trucks.

Traction mechanisms are understood in particular as also including belts and chains.

DISCLOSURE OF THE INVENTION

The object of being able to provide a fail-safe solution is achieved in that the first end of the sleeve has a larger circumference than a second end opposite the first end. The sleeve can thereby be inserted into the guide member from the engine side, with a sufficiently large flange region of the sleeve being available in order to equalize the forces arising when the sleeve is pressed together onto the engine part, without the two components being damaged.

The necessary surface pressure can be ensured even if an engine part is made from aluminum if said engine part is, as customary, of thin-walled design.

The guide member is also prevented from becoming loose during operation of the internal combustion engine. This is because, by applying prestress via a bolt which fastens the guide member to the engine part, the plastics material of the guide memb member is prevented from beginning to creep. The prestressing of the bolt is maintained as a result.

Advantageous embodiments are claimed in the dependent claims and are explained in more detail below.

It is advantageous if the sleeve receives a bolt, the bolt head of which rests on the second end. The main force brought about by the bolt is conducted in the axial direction of the sleeve primarily via the sleeve and not via the guide member manufactured from plastic.

The use of the guide member as a guide rail or tensioning rail is possible depending on the configuration of the fit between the sleeve and the guide member or between the bolt and the sleeve or between the bolt and the guide member.

It is also advantageous if the through opening is of stepped design and is preferably formed in a rotationally symmetrical manner, with a first section of larger diameter being formed on the side of the second end of the sleeve. The bolt head can thereby be recessed in the guide member and does not protrude out of the latter. Better packaging in the engine compartment of a vehicle driven by an internal combustion engine is then possible. It is particularly advantageous if, with the guide member being mounted on the engine part, the bolt ends flush with the guide member.

If there is a gap, which is basically oriented in the direction of the longitudinal axis of the sleeve, between the sleeve and the through opening and/or between the through opening and the bolt, the relative movements required in tensioning rails can be realized. The wear resistance is then increased.

If the sleeve has an encircling groove which is preferably arranged eccentrically, then, firstly, a transportation lock can be provided and, secondly, misfitting of the sleeve in the guide member can be avoided.

It has turned out to be particularly advantageous if an encircling projection, which may also be formed in an interrupted manner, engages in the groove as a transportation lock. An integral projection of this type fitted on the guide member can be produced in a simple manner in terms of injection molding technology and permits a cost reduction for the corresponding component.

Conventional cost-effective materials can be used if the sleeve is manufactured from steel.

If a flange which has an outer diameter which is greater than the wall thickness of the sleeve is formed at the first end of the sleeve of rotationally symmetrical configuration, the guide member can be adjusted to the specific requirements of individual traction mechanism drives depending on the load.

It is also advantageous if the guide member is designed as a guide rail or tensioning rail and the through opening is designed as an elongated hole. Thermal expansions and a necessary compensation of tolerances can be brought about specifically by the provision of an elongated hole, or alternatively by the provision of an enlarged through opening, which may also be configured in the form of a bore, and therefore unnecessary stresses do not occur in the work pieces.

Figure 2:
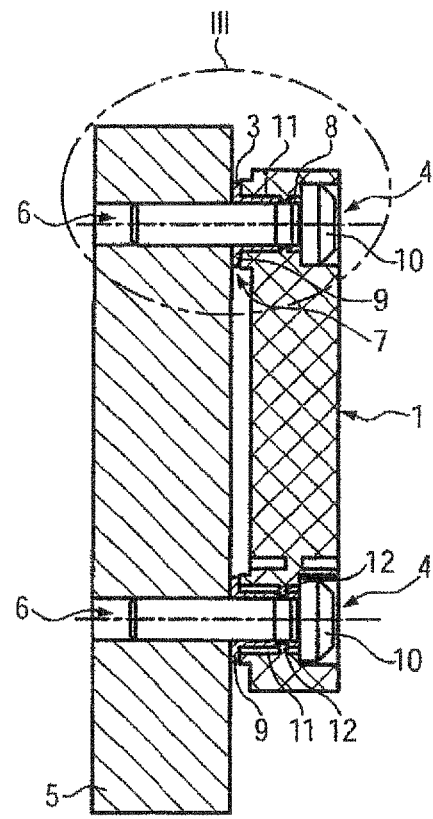
Figure 3:
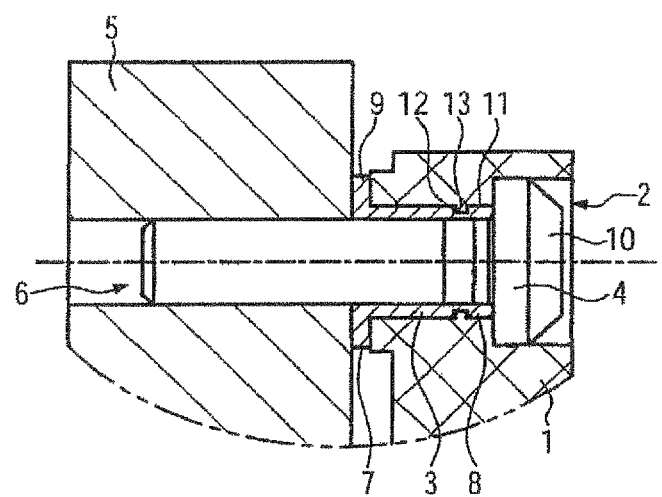
Figure 4:
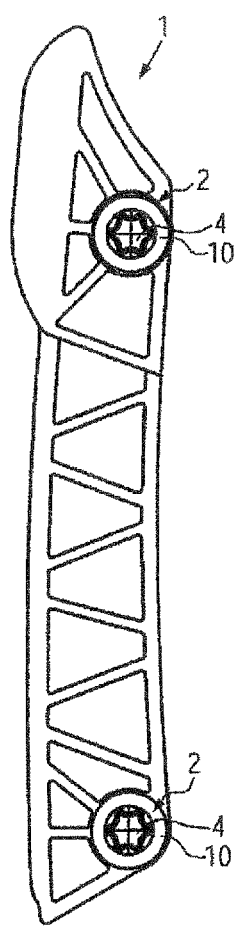
Figure 5:
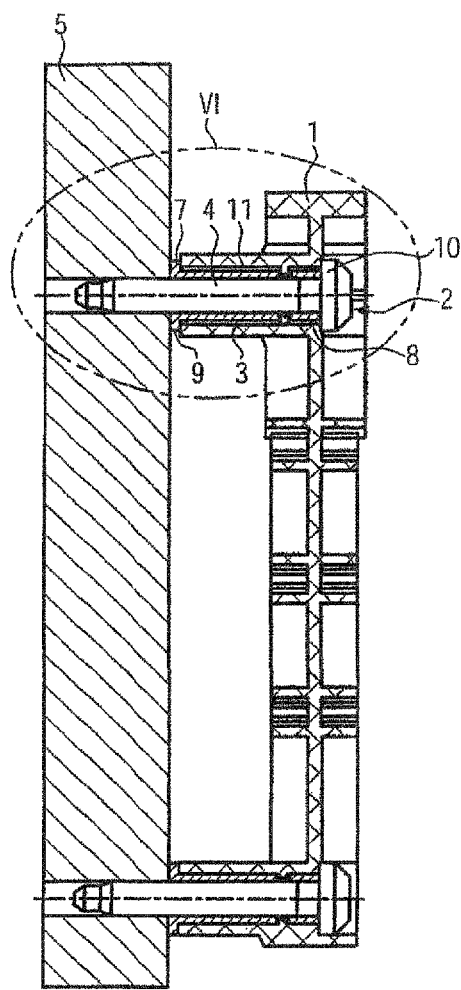
Figure 6:
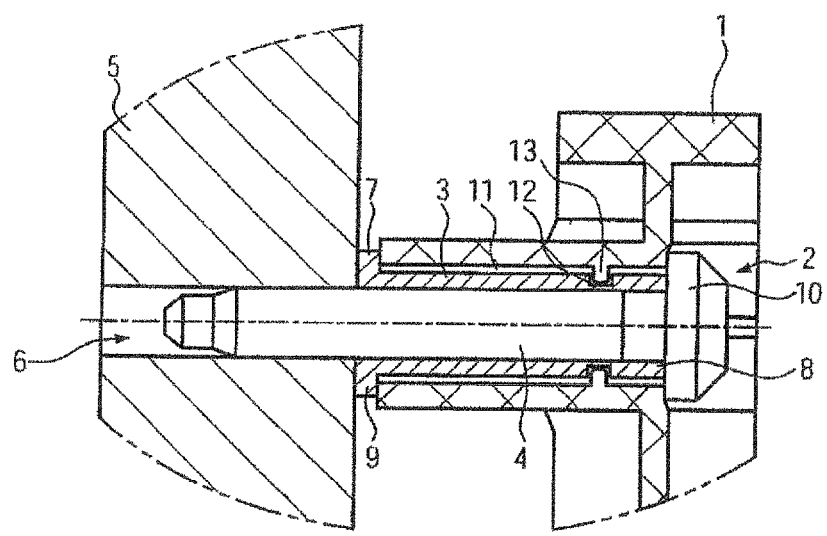

The invention is also explained in more detail below with the aid of a drawing, in which:

FIG. 1 shows a first embodiment of a guide member as a guide rail, in a view from above, FIG. 2 shows a cross section through the guide member of the first exemplary embodiment when mounted on an engine part, FIG. 3 shows an enlarged illustration of the detail III from FIG. 2, FIG. 4 shows a second embodiment of a guide member as a guide rail, in a view from above, FIG. 5 shows an illustration, which is comparable to FIG. 2, of the second exemplary embodiment in a section, when mounted on an engine part, and FIG. 6 shows an enlarged illustration of the detail VI from FIG. 5.

The figures are merely of a schematic nature and are used exclusively for understanding the invention.

The same reference numbers are used for the same elements.

FIG. 1 illustrates a first exemplary embodiment of a guide member 1. The guide member is designed as a guide rail but, given appropriate selection of the tolerances for the individual elements, may also be designed as a tensioning rail.

The guide member 1 is manufactured from plastic and is used in a traction mechanism drive, in particular in a chain drive, in an internal combustion engine. However, the guide member can also be used in belt drives. Traction mechanism drives of this type are required in the control system of the internal combustion engine.

It is possible for special slide linings also to be fitted, in particular clipped, onto the guide member in order to reduce the frictional resistance between the traction mechanism and the guide member.

Two through openings 2 are supplied in the guide member. The through openings 2 are manufactured in the form of bores, but may also be provided by primary forming.

A sleeve 3 is inserted into each of the through openings 2. The sleeve 3 is manufactured from metallic material, in particular from steel.

A bolt 4 is inserted into the sleeve 3. Said sleeve 3 can be seen particularly well in FIGS. 2 and 3.

In FIG. 2, the guide member 1 is fitted on an engine part 5, for example an engine block, via the sleeve 3 and the bolt 4. In the present exemplary embodiment, the engine part 5 is manufactured from light metal, in particular from an aluminum alloy. In this case, the bolts 4 engage in holes 6 provided with threads.

The sleeve 3 has a first end 7 and a second end 8. The first end 7 bears against the engine part 5.

The second end 8 has a smaller outer circumference than the first end 7.

In the exemplary embodiment illustrated, the sleeve 3 is of rotationally symmetrical configuration and has a cylindrical passage. The outside of the sleeve 3 is also of rotationally symmetrical configuration. There is therefore a larger outer diameter at the first end 7 than at the second end 8.

This corresponding configuration results in the formation of a flange 9 on the engine side of the sleeve 3, which flange 9 permits a necessary surface pressure between the sleeve 3 and the engine part 5.

The bolt has a bolt head 10 which is contained in the interior of the of a guide member 1.

That side of the bolt head which faces the engine part 5 is in contact with the second end 8 and, if needed, may also be in contact with the material of the guide member 1. This is desirable, in particular, if the guide member 1 is designed as a guide rail.

Whereas there is only a very small gap 11 at one sleeve 3, in the transition region to the guide member 1, a somewhat larger gap 11 is maintained between the other sleeve 3 and the guide member 1.

An incision in the form of a groove 12 can also be seen on the outside of said second sleeve, which is illustrated at the bottom of the figure in FIG. 2. A bead-like projection 13 of the guide member 1 engages in said groove 12. Said projection 13 is not necessarily designed to fully encircle the inside of the through opening 2, but rather may also be configured in an interrupted manner. The dimensioning of the groove 12 and of the projection 13 is intended to serve as a transportation lock, and therefore care should be taken to ensure that, as far as possible, when bolting the bolt 4 onto the engine part 5 in order to fasten the guide member 1, the projection 13 is not damaged.

One of the two through openings 2 may also be configured in the form of an elongated hole.

The interaction of the guide member 1 with the sleeve 3, the bolt 4 and the engine part 5 can be seen in more detail in FIG. 3.

In the second exemplary embodiment according to FIGS. 4 to 6, a longer sleeve 3 is used than in the first exemplary embodiment.

The bolt 4 is also of stepped configuration.

For installation purposes, each of the sleeves 3 is introduced on the engine side into the corresponding through opening 2, as a result of which the projection 13 clips into the groove 12 and constitutes a transportation lock. The guide member 1 with the inserted sleeves 3 is subsequently fitted onto the engine part 5 and two bolts 4 are passed through the sleeves 3 and bolted into the engine part 5.

LIST OF REFERENCE NUMBERS

1 Guide member
2 Through opening
3 Sleeve
4 Bolt
5 Engine part
6 Hole
7 First end of the sleeve
8 Second end of the sleeve
9 Flange
10 Bolt head
11 Gap
12 Groove
13 Projection

The invention claimed is:

1. A guide member of a traction mechanism drive for use on an internal combustion engine, comprising:
a one-piece guide member body having at least one through opening and a one-piece metallic sleeve inserted into the at least one through opening, the sleeve having a first end which, projecting out of the through opening, is arranged such that the first end can be brought into contact with an engine part, wherein the first end of the sleeve has a larger circumference than a second end, opposite the first end, the larger circumference at the first end forms a flange, at least an outer surface of the sleeve including the flange is of rotationally symmetric configuration, and the guide member body is configured so that the flange is arranged between the guide member and an underlying portion of the internal combustion engine and prevents the guide member body from contacting the underlying portion of the internal combustion engine, wherein the sleeve includes two circumferentially extending surfaces defining an encircling groove therebetween and the at least one through opening of the guide member body includes a projection that engages in the groove as a transportation lock, wherein the groove and projection are arranged and dimensioned so that the projection clips into the groove when the sleeve is introduced into the at least one through opening.

2. The guide member according to claim 1, wherein the sleeve receives a bolt which has a bolt head and the bolt head rests on the second end.

3. The guide member according to claim 2, wherein there is a gap, which is oriented in a direction of a longitudinal axis of the sleeve, between the sleeve and the through opening and/or between the through opening and the bolt.

4. The guide member according to claim 1, wherein the through opening is of stepped design and is formed in a rotationally symmetrical manner, with a first section of larger diameter being formed on a second side of the through opening, opposite the first side.

5. The guide member according to claim 4, wherein a second end of the sleeve, opposite the first end, extends only as far as the first section of larger diameter.

6. The guide member according to claim 1, wherein the encircling groove is arranged eccentrically.

7. The guide member according to claim 6, wherein the projection is an encircling projection formed in an interrupted manner.

8. The guide member according to claim 1, wherein the sleeve is manufactured from steel.

9. The guide member according to claim 1, wherein the guide member body is a guide rail or a tensioning rail and the through opening is an elongated hole.

10. The guide member according to claim 1, wherein the guide member body is manufactured from plastic.

11. The guide member according to claim 10, wherein the sleeve is manufactured from steel.

12. The guide member according to claim 11, wherein the underlying surface of the internal combustion engine is manufactured from aluminum or an aluminum-containing alloy.

* * * * *